United States Patent [19]

You

[11] Patent Number: 5,198,058
[45] Date of Patent: Mar. 30, 1993

[54] METHOD OF MAKING GOLF CLUB OF PLASTIC COMPOSITE MATERIAL

[76] Inventor: Chin-San You, No. 3, Lane 1029, Feng-Shyn Road, Feng Yuan City, Taichung Hsien, Taiwan

[21] Appl. No.: 933,134

[22] Filed: Aug. 20, 1992

[51] Int. Cl.$^5$ ............................................. B29C 43/02
[52] U.S. Cl. ..................................... 156/173; 156/184; 156/189; 156/191; 156/194; 156/156; 156/245; 273/81 R; 273/81 A; 273/80 R
[58] Field of Search ............... 156/173, 184, 189, 191, 156/194, 156, 245; 273/81 R, 81 A, 81.5 80 R, 167 R, 167 F, 167 J, 168, 173

[56] References Cited

U.S. PATENT DOCUMENTS

| | | | |
|---|---|---|---|
| 2,339,121 | 1/1944 | Van Cleef | 156/194 |
| 2,768,921 | 10/1956 | Pigg | 156/194 |
| 2,809,144 | 10/1957 | Grimes | 156/189 |
| 2,991,080 | 7/1961 | Redmond | 156/189 |
| 4,860,481 | 8/1989 | Christenson | 156/194 |
| 5,028,464 | 7/1991 | Shigetoh | 156/189 |

*Primary Examiner*—Caleb Weston
*Attorney, Agent, or Firm*—Browdy and Neimark

[57] ABSTRACT

A method of making a golf club includes the use of an inner tube, which is made of an elastic and refractory material and is wrapped orderly onto with at least a matrix layer of thermoplastic material and with at least a reinforcing layer of long fiber material so as to form a tubular body having a laminated outer shell. The tubular body is heated in a molding tool up to a temperature corresponding to the melting point of the thermoplastic plastic material. A pressurized gas is introduced into the tubular body to force the molten thermoplastic plastic material to diffuse evenly into the interstices of fiber bundles making up the long fiber material. After being cooled, the molding tool is opened to remove therefrom the golf club made of plastic composite material. Such golf club is tough, light in weight, and has an excellent shock-absorbing quality.

8 Claims, 3 Drawing Sheets

METHOD OF MAKING GOLF CLUB OF PLASTIC COMPOSITE MATERIAL

FIELD OF THE INVENTION

The present invention relates to a golf club, and more particularly to a method of making a golf club of thermoplastic plastic composite material.

BACKGROUND OF THE INVENTION

A great majority of conventional golf clubs of the prior art are generally made of a wooden material such as a hickory wood, or a metal material such as steel or aluminum. A wooden golf club has an advantage that it does not transmit a shock wave easily; nevertheless it has a shortcoming of being vulnerable to distortion caused by a change in the climatic elements. On the contrary, a metal golf club is resistant to distortion caused by a change in the climatic elements and is bound to transmit a shock wave to a player's hands holding the golf club. Therefore, some manufacturers have come up with golf clubs of thermosetting plastic composite material, such as carbon fiber preimpregnated in epoxy resin. Such golf clubs have an improved quality of absorbing a shock wave and are invulnerable to distortion caused by a change in the climatic elements; nevertheless they are not endowed with an excellent elasticity and are potential sources of environmental pollution, in view of the fact that the thermosetting plastic material and the epoxy resin, which are used to make the golf clubs, can not be recycled easily and economically.

SUMMARY OF THE INVENTION

It is, therefore, the primary objective of the present invention to provide a method of making a golf club of plastic composite material. Such golf club has excellent shock-absorbing and elastic qualities and is resistant to distortion brought about by a change in the climatic elements.

It is another objective of the present invention to provide a method of making a golf club of plastic composite material. Such golf club can be recycled easily so as to prevent it from being a potential source of environmental pollution.

In keeping with the principles of the present invention, the foregoing objectives of the present invention are accomplished by a method of making a golf club of plastic composite material, which makes use of a thermoplastic plastic material as a matrix and of a long fiber material as a reinforcing material. The method includes the steps of: (a) using a tapered mandrel which is fitted over by an inner tube of elastic and refractory material; (b) covering in a sequence the surface of the inner tube with at least a layer of thermoplastic plastic matrix and a reinforcing layer of long fiber material; (c) withdrawing the mandrel to form a hollow tubular object having a laminated outer shell; (d) arranging the tubular object in a molding tool; (e) closing the molding tool and subsequently subjecting the molding tool to a heat having a temperature corresponding to the melting point of the thermoplastic plastic matrix; (f) introducing a pressurized gas into the tubular object in such a manner that the pressure is increased progressively so as to force the molten thermoplastic plastic matrix to diffuse uniformly into the interstices of the fiber bundles making up the long fiber material; and (g) allowing the molding tool to cool, from which the golf club of the present invention is removed.

DETAILED DESCRIPTION OF THE PREFERRED EMBODIMENTS

Figure 1:
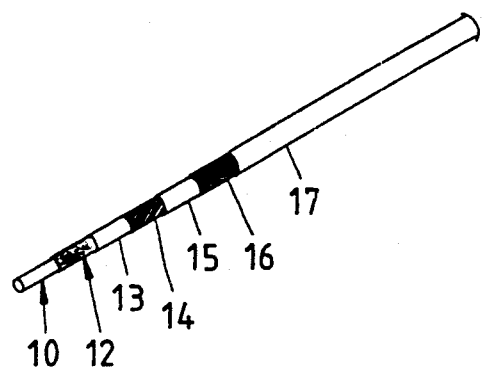
FIG. 1 is a schematic view of a first preferred embodiment of the present invention, showing that a metal mandrel is fitted over by a thermoplastic plastic tube and a long fiber fabric tube.
Figure 2:
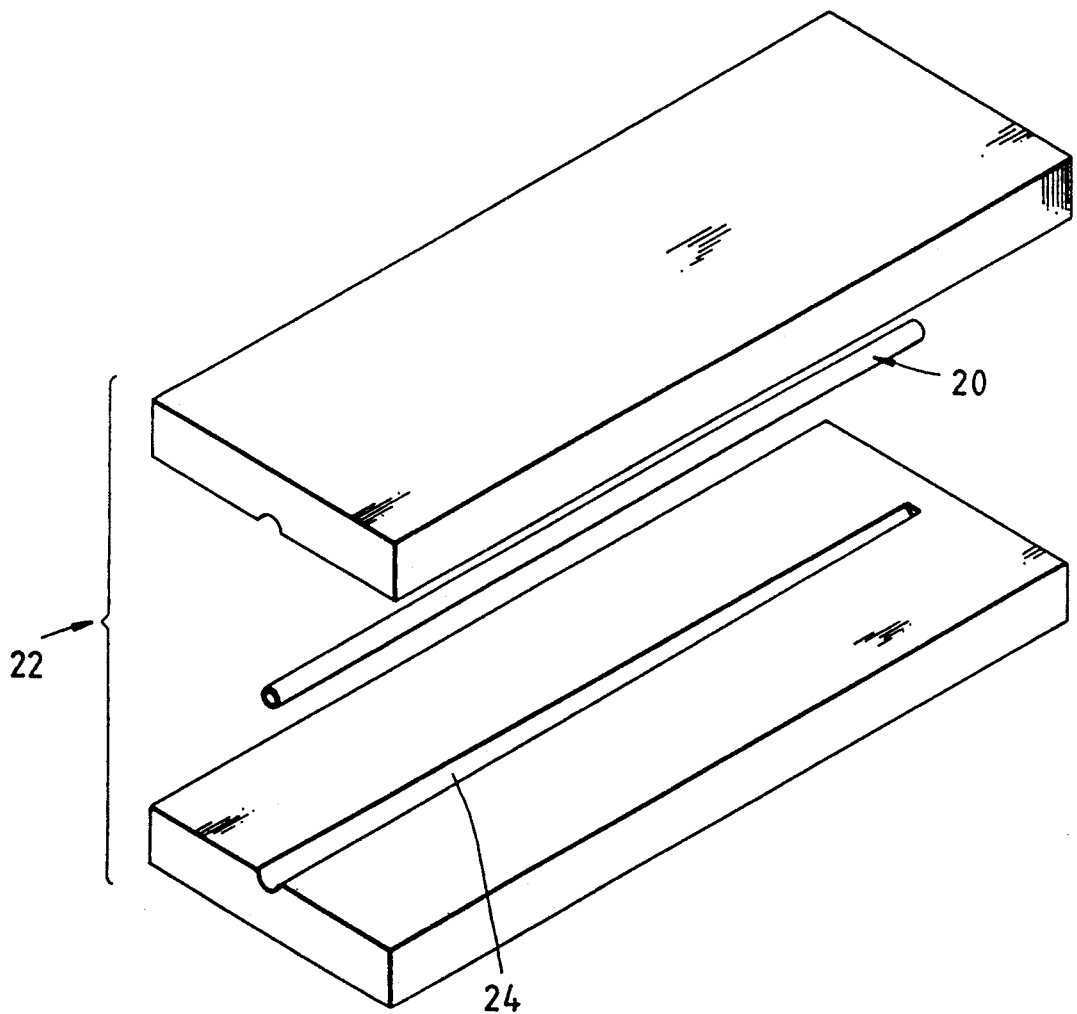
FIG. 2 is a perspective view showing that a tubular body of a laminated outer shell is put into a molding tool, according to the first preferred embodiment of the present invention.
Figure 3:
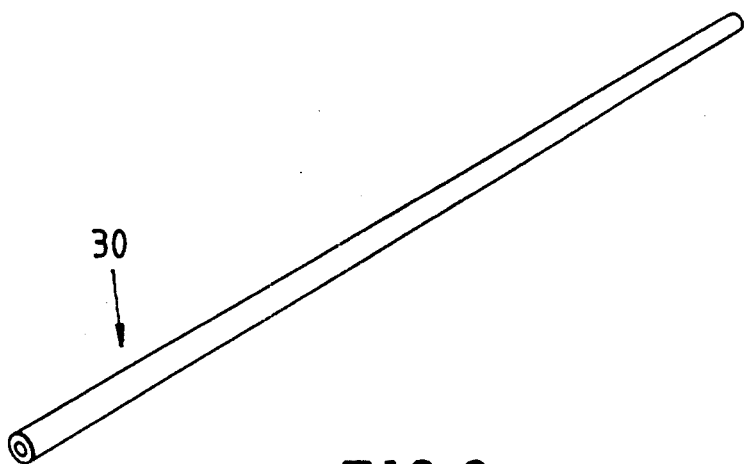
FIG. 3 shows a perspective view of a golf club produced by the method of the present invention.

As illustrated in FIGS. 1-3, the first preferred embodiment of the present invention includes eight steps. The first step involves a process of making use of a tapered mandrel 10 of a metal material, which has a dimension smaller than that of a golf club intended to be made. In the second step, the mandrel 10 is fitted over with an inner tube 12 of a refractory and elastic material such as silicone rubber. The third step comprises a process of fitting over the inner tube 12 orderly with a first thermoplastic plastic thin tube 13, a second thermoplastic plastic thin tube 15, a third thermoplastic plastic thin tube 17, a first long fiber fabric tube 14, and a second long fiber fabric tube 16. The fourth step comprises a process of withdrawing the mandrel 10 to form a tubular body 20 having a laminated outer shell. In the fifth step, one end of the tubular body 20 is sealed before the tubular body 20 is arranged in a mold cavity 24 of a molding tool 22. In the sixth step, the molding tool 22 is heated up to a temperature, which ranges between 220 degrees and 240 degrees in Celsius and causes the thermoplastic plastic thin tubes 13, 15 and 17 to melt. In the seventh step, under the condition that the temperature of the sixth step is maintained, a first pressurized gas having a pressure between 1 and 3 kg/cm is introduced into the tubular body 20 for a period lasting about five minutes. Thereafter, a second pressurized gas having a pressure in a range between 5 and 10 kg/cm is introduced into the tubular body 20 so as to force the molten thermoplastic plastic material to diffuse evenly into the interstices of fiber bundles of the long fiber fabric tubes 14 and 16. In the eighth step, the molding tool 22 is cooled to permit the curing process of the molten thermoplastic plastic material to take place and is then opened to remove therefrom a golf club 30.

Figure 4:
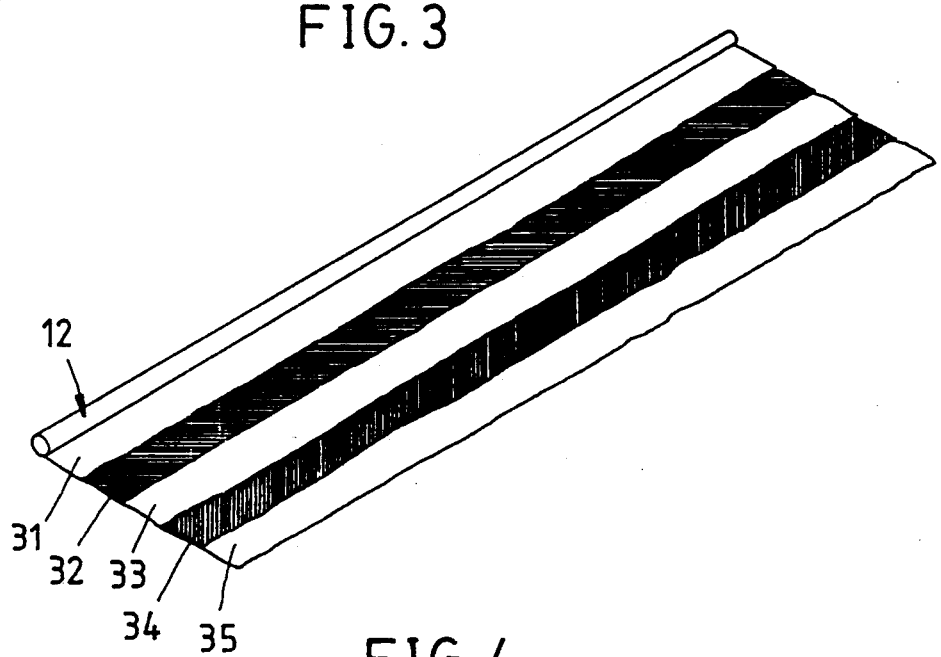
FIG. 4 is a schematic view showing that an inner tube is wrapped onto orderly with the matrix layers of thermoplastic plastic films and with the reinforcing layers of long fiber thin boards, according to a second preferred embodiment of the present invention.

The thermoplastic plastic thin tubes 13, 15 and 17 are made of a polyamide material such as nylon. Each of the long fiber fabric tubes 14 and 16 is made of carbon fibers, or boron fibers or glass fibers, which are 0.1-10 m in length and are arranged at a predetermined angle. The laminated outer shell of the inner tube 12 may be made of flat and spread thermoplastic plastic films 31, 33, 35, and long fiber thin boards 32 and 34, which are wrapped in a sequence onto the inner tube 12, as shown in FIG. 4.

Figure 5:
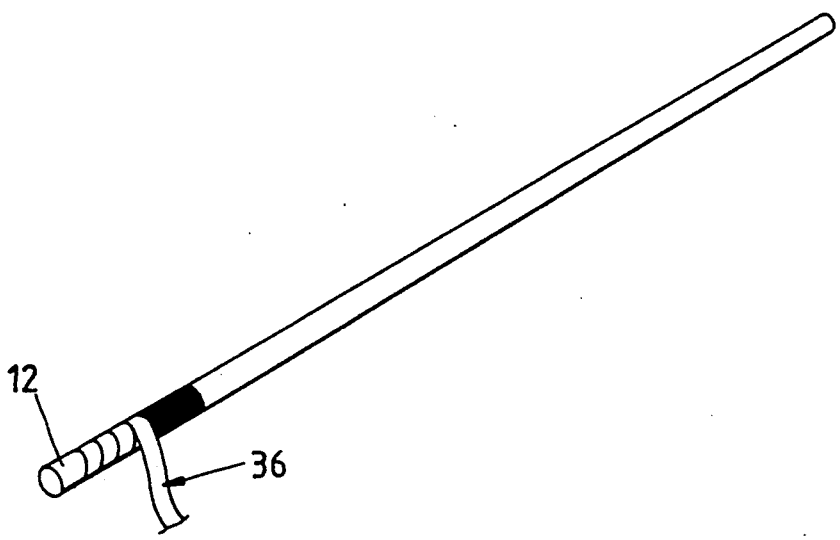
FIG. 5 is a schematic view showing that an inner tube is wrapped onto with a ribbonlike matrix film of thermoplastic plastic material, according to a third preferred embodiment of the present invention.
Figure 6:
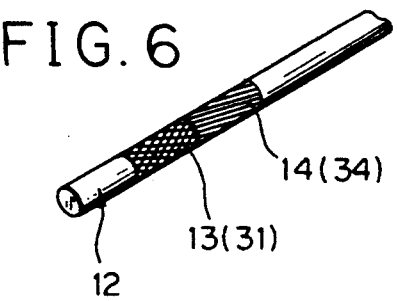
FIG. 6 is a schematic view showing that an inner tube is wrapped onto with a netlike matrix film of thermoplastic plastic material, according to a fourth preferred embodiment of the present invention.
Figure 7:
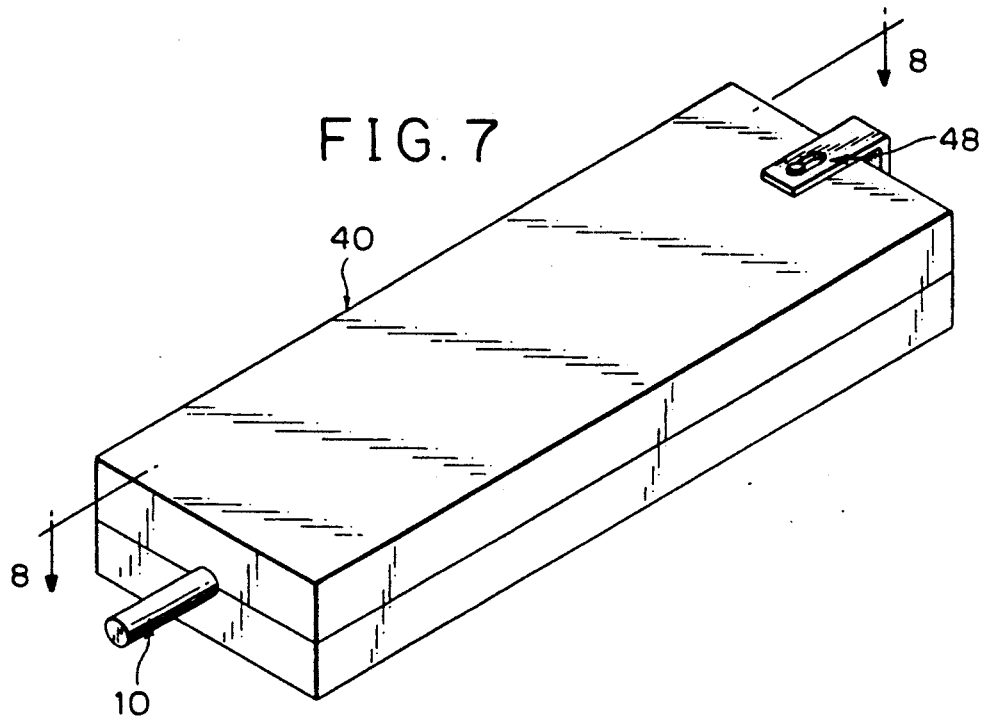
FIG. 7 is a schematic view showing that a mandrel fitted over with a tubular body is arranged in a molding tool, according to a fifth preferred embodiment of the present invention.

As shown in FIG. 5, a ribbonlike film 36 of thermoplastic plastic material may be used to take the place of the thermoplastic plastic thin tubes 13, 15, 17, and the thermoplastic plastic films 31, 33 and 35. With a view to accelerating the melting process of the thermoplastic plastic matrix, the thermoplastic plastic thin tubes 13, 15, 17, and the thermoplastic plastic films 31, 33 and 35 have a netlike surface, as shown in FIG. 6.

Figure 8:
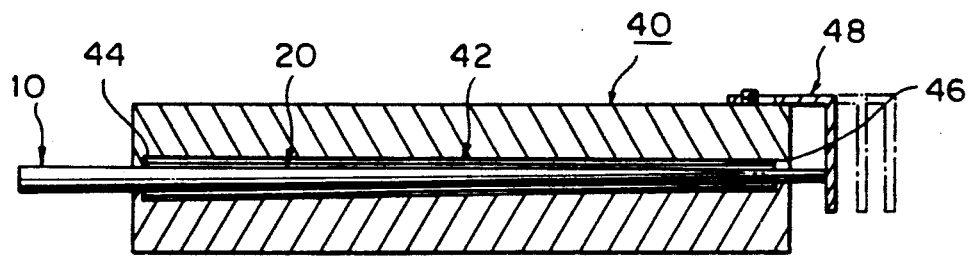
FIG. 8 shows a sectional view of a portion taken along the line 8—8 as shown in FIG. 7.

As illustrating in FIGG. 7 and 8, the method of the present invention may be embodied in another form, in which the tubular body 20 is formed by the mandrel 10 which is fitted directly over with the thermoplastic plastic thin tubes 13, 15, 17, and the long fiber fabric tubes 14 and 16. The tubular body 20, along with the mandrel 10, is placed in a mold cavity 42 of a molding tool 40. The mold cavity 42 has shoulders 44 and 46 for holding the tubular body 20. In addition, a baffle 48 is movably mounted on the top of the front end of the molding tool 40. As soon as the molding tool 40 is heated up to a temperature in a range of 220-240 degrees in Celsius, the mandrel 10 is pushed forward to be at a first position making contact with the baffle 48. In about five minutes, the mandrel 10 is pushed forward again beyond the first position to be at a second position as indicated by dotted lines in FIG. 8. Such maneuvers are helful in generating a step-by-step pattern of pressurization, which serves to force the molten thermoplastic plastic material to permeate uniformly the interstices of the fiber bundles making up the long fiber material of the reinforcing layers.

the golf club produced by the method of the present invention is so tough as to be immune from distortion caused by a change in the climatic elements and is provided with an excellent quality of absorbing the shock wave. In addition, the thermoplastic plastic material used as a matrix in the method of the present invention can be easily recovered by means of subjecting the golf club to a heat having a temperature corresponding to the melting point of the thermoplastic plastic material.

What is claimed is:

1. A method of making a golf club of plastic composite material, in which a thermoplastic plastic material is used as a matrix, and in which a long fiber material is used as a reinforcing material, comprising the steps of:
   (a) making use of a tapered mandrel;
   (b) using an inner tube of an elastic and refractory material to fit over said mandrel;
   (c) wrapping orderly onto said inner tube with at least a matrix layer of said thermoplastic plastic material, and with at least a reinforcing layer of said long fiber material;
   (d) withdrawing said mandrel from said inner tube so that said inner tube having a laminated outer shell formed by said matrix layer and said reinforcing layer becomes a hollow tubular body, which has an end that is sealed and which is subsequently arranged in a molding tool;
   (e) heating said molding tool up to a temperature corresponding to the melting point of said thermoplastic material so that said thermoplastic plastic material becomes a molten thermoplastic plastic material;
   (f) introducing, under the condition that said temperature is maintained, a pressurized gas having a pressure into said tubular body in such a manner that said pressure of said gas is increased progressively and stepwise so as to force said molten thermoplastic plastic material to permeate uniformly the interstices of fiber bundles making up said long fiber material;
   (g) cooling said molding tool to bring about the completion of a curing process of said molten thermoplastic plastic material which fills the interstices of said fiber bundles; and
   (h) opening said molding tool to remove therefrom said golf club.

2. A method of making a golf club of plastic composite material, in which a thermoplastic plastic material is used as a matrix, and in which a long fiber material is used as a reinforcing material, including the steps of:
   (a) making use of a mandrel having a tapered end;
   (b) wrapping orderly onto said mandrel with at least a matrix layer of said thermoplastic plastic material, and with at least a reinforcing layer of said long fiber material to form a tubular body provided with said mandrel and a laminated outer shell which is formed by said matrix layer and said reinforcing layer;
   (c) putting said tubular body into a mold cavity of a molding tool in such a way that said mandrel can be moved in a direction opposite to an axis of said tubular body;
   (d) heating said molding tool up to a temperature corresponding to the melting point of said thermoplastic plastic material;
   (e) moving stepwise said mandrel in a direction toward said tapered end of said mandrel, under the condition that said temperature is maintained while the process of moving said mandrel is in progress; and
   (f) allowing said molding tool to cool so as to remove said golf club from said molding tool.

3. The method of claim 1 wherein said matrix layer takes the form of a thermoplastic plastic thin tube.

4. The method of claim 1 wherein said matrix layer takes the form of a flat and spread thermoplastic plastic film.

5. The method of claim 1 wherein said matrix layer takes the form of a thermoplastic plastic ribbon.

6. The method of claim 1 wherein said reinforcing layer takes the form of a long fiber fabric tube.

7. The method of claim 1 wherein said reinforcing layer takes the form of a long fiber thin board.

8. The method of claim 1 wherein said matrix layer has a netlike surface.

* * * * *